United States Patent
Hosaka

(10) Patent No.: US 11,562,672 B2
(45) Date of Patent: Jan. 24, 2023

(54) LIQUID CRYSTAL PROJECTOR HAVING NON-ADJACENT DISPLAY PIXELS

(71) Applicant: SEIKO EPSON CORPORATION, Tokyo (JP)

(72) Inventor: Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 37 days.

(21) Appl. No.: 17/189,829

(22) Filed: Mar. 2, 2021

(65) Prior Publication Data
US 2021/0280107 A1  Sep. 9, 2021

(30) Foreign Application Priority Data
Mar. 3, 2020 (JP) .............................. JP2020-035409

(51) Int. Cl.
*G09G 3/00* (2006.01)
*G09G 3/36* (2006.01)
*H04N 9/31* (2006.01)

(52) U.S. Cl.
CPC ........... *G09G 3/007* (2013.01); *G09G 3/3607* (2013.01); *H04N 9/317* (2013.01)

(58) Field of Classification Search
CPC ...... G09G 3/007; G09G 3/3607; G09G 3/003; G09G 3/002; G09G 5/02; H04N 9/317; H04N 9/3188; G03B 21/14; G02F 1/13471

See application file for complete search history.

(56) References Cited

U.S. PATENT DOCUMENTS

| | | | | |
|---|---|---|---|---|
| 6,384,816 B1* | 5/2002 | Tabata | ................ | G02F 1/13471 345/204 |
| 2003/0133060 A1* | 7/2003 | Shimada | ................ | G09G 3/002 348/E9.027 |
| 2005/0275642 A1* | 12/2005 | Aufranc, Jr. | ............ | G09G 5/02 345/204 |
| 2013/0083244 A1 | 4/2013 | Hosaka et al. | | |
| 2013/0242210 A1* | 9/2013 | Endo | ....................... | G03B 21/14 349/8 |
| 2015/0219983 A1* | 8/2015 | Mash | ................... | H04N 9/3188 353/121 |
| 2015/0371577 A1 | 12/2015 | Hosaka | | |
| 2017/0054879 A1 | 2/2017 | Hosaka et al. | | |
| 2019/0066553 A1* | 2/2019 | Ohkoba | ................ | G09G 3/003 |

(Continued)

FOREIGN PATENT DOCUMENTS

| | | |
|---|---|---|
| JP | 2008-203626 A | 9/2008 |
| JP | 2012-155212 A | 8/2012 |
| JP | 2016-004237 A | 1/2016 |

(Continued)

*Primary Examiner* — Richard J Hong
(74) *Attorney, Agent, or Firm* — Oliff PLC

(57) ABSTRACT

A liquid crystal projector includes a liquid crystal panel, a shift device and a display control circuit. The liquid crystal panel includes a plurality of panel pixels. The shift device shifts projection positions of the plurality of panel pixels. The display control circuit controls the liquid crystal panel to cause one of the panel pixels to represent k (k is an integer equal to or more than 3) display pixels that are in a non-adjacent relationship in k unit periods in a frame period, and the display control circuit controls the shift device to vary the projection position for each of the k unit periods.

4 Claims, 11 Drawing Sheets

(56) References Cited

U.S. PATENT DOCUMENTS

2020/0098295 A1  3/2020  Hosaka
2020/0145627 A1  5/2020  Hosaka et al.

FOREIGN PATENT DOCUMENTS

| JP | 2018-097023 A | 6/2018 |
| JP | 2020-052132 A | 4/2020 |
| JP | 2020-077911 A | 5/2020 |

* cited by examiner

FIG. 23

LIQUID CRYSTAL PROJECTOR HAVING NON-ADJACENT DISPLAY PIXELS

The present application is based on, and claims priority from JP Application Serial Number 2020-035409, filed on Mar. 3, 2020, the disclosure of which is hereby incorporated by reference herein in its entirety.

BACKGROUND

1. Technical Field

The present disclosure relates to a liquid crystal projector.

2. Related Art

In connection with a liquid crystal projector, there is a known technique that uses a shift device to shift a projection pixel projected on a screen or the like in order to achieve pseudo-enhancement of resolution of an image displayed by a liquid crystal panel (see, for example, JP-A-2008-203626). This technique allows a user to visually recognize as if the number of projected pixels is more than the number of pixels in a liquid crystal panel.

However, the technique described above has a problem of reduction in the display quality for some images to be displayed.

SUMMARY

In order to solve the problem described above, a liquid crystal projector according to an aspect of the present disclosure includes a liquid crystal panel including a plurality of panel pixels, a shift device that shifts projection positions of the plurality of panel pixels, and a display control circuit that controls the liquid crystal panel and the shift device, in which the display control circuit controls the liquid crystal panel to cause one of the panel pixels to represent k (k is an integer equal to or more than 3) display pixels that are in a non-adjacent relationship in k unit periods in a frame period, and the display control circuit controls the shift device to vary the projection position for each of the k unit periods.

BRIEF DESCRIPTION OF THE DRAWINGS

FIG. 23 is a diagram used to explain an example of occurrence of orientation failure according to a comparative example.

DESCRIPTION OF EXEMPLARY EMBODIMENTS

Below, an electro-optical device according to embodiment will be described with reference to the drawings. It should be noted that the dimension or scale of each portion is set so as to appropriately differ from the actual dimension or scale of each corresponding portion. In addition, the embodiment described below is a preferred specific example. Thus, various types of technically preferred limitations are applied. However, the scope of the present disclosure is not limited to these modes unless, in the following description, there is description that particularly limits the present disclosure.

Figure 1:
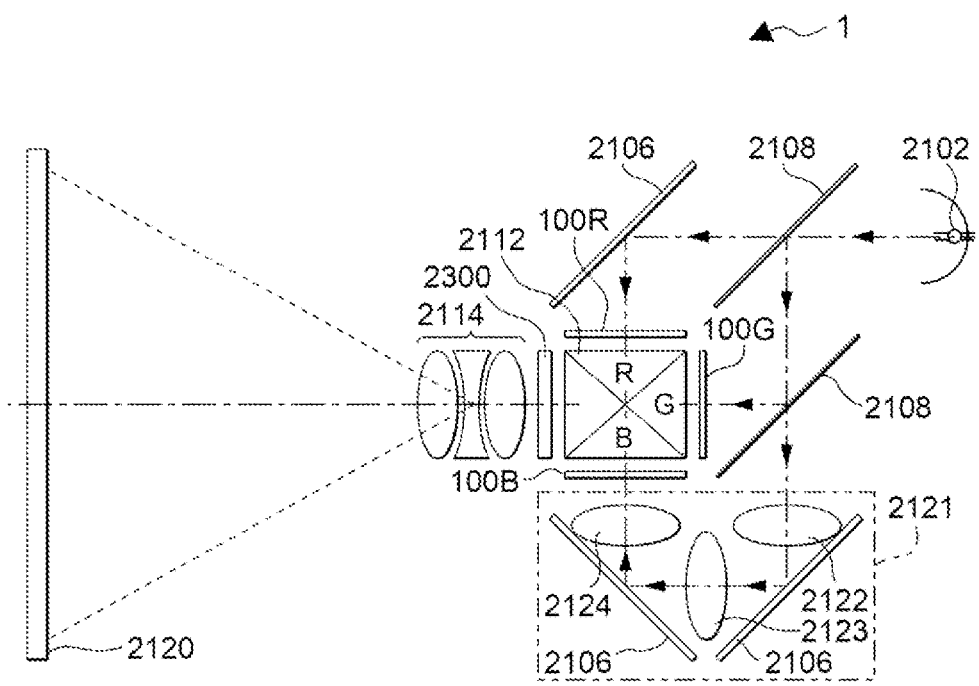
FIG. 1 is a diagram illustrating a liquid crystal projector according to a first embodiment.

FIG. 1 is a diagram illustrating an optical configuration of a liquid crystal projector 1 according to a first embodiment. As illustrated in the drawing, the liquid crystal projector 1 includes liquid crystal panels 100R, 100G, and 100B. In addition, a lamp unit 2102 including a white light source such as a halogen lamp is provided within the liquid crystal projector 1. The projection light emitted from this lamp unit 2102 is split into three primary colors of red (R), green (G), and blue (B) by three mirrors 2106 and two dichroic mirrors 2108 installed inside. Of the light of the primary colors, the light of R, the light of G, and the light of B enter the liquid crystal panel 100R, the liquid crystal panel 100G, and the liquid crystal panel 100B, respectively.

Note that the optical path of B is longer than those of other red and green. Thus, the light of B is caused to pass through a relay lens system 2121 including an incidence lens 2122, a relay lens 2123, and an output lens 2124, and is guided to the liquid crystal panel 100B in order to avoid a loss resulting from the optical path.

The liquid crystal panel 100R includes a plurality of pixel circuits arranged in a matrix manner. The pixel circuits each include a liquid crystal element. The liquid crystal element of the liquid crystal panel 100R is driven on the basis of a data signal corresponding to R, which will be described later, to have a transmittance corresponding to the voltage of this data signal. Thus, in the liquid crystal panel 100R, by individually controlling the transmittance of the liquid crystal element, it is possible to generate a transmitted image of R. Similarly, the liquid crystal panel 100G generates a transmitted image of G on the basis of a data signal corresponding to G. The liquid crystal panel 100B generates a transmitted image of B on the basis of a data signal corresponding to B.

The transmitted image of each of the colors generated by the corresponding liquid crystal panel 100R, 100G, and 100B enters a dichroic prism 2112 from three directions. Then, at this dichroic prism 2112, the light of R and the light of B are refracted at 90 degrees, whereas the light of G travels in a straight line. Thus, the dichroic prism 2112 combines the images of individual colors. The combined image by the dichroic prism 2112 passes through a shift device 2300, and enters a projection lens 2114.

The shift device 2300 shifts, along two axes each perpendicular to this optical axis, the optical axis of the combined image outputted from the dichroic prism 2112 and reaching a screen 2120. Specifically, the shift device 2300 is configured to be able to shift the position of the combined image projected onto the screen 2120 in directions along two axes of the X axis in the horizontal direction and the Y axis in the vertical direction as viewed toward the projection plane. The projection lens 2114 enlarges the combined image that has passed through the shift device 2300, and the enlarged image is projected on the screen 2120.

Note that, while the transmitted images through the liquid crystal panels 100R and 100B are reflected by the dichroic prism 2112 and then are projected, the transmitted image through the liquid crystal panel 100G travels straight and is projected. Thus, the transmitted images through the liquid crystal panels 100R and 100B each have a left-right inverted relationship with respect to the transmitted image through the liquid crystal panel 100G.

For the purpose of convenience of explanation, a pixel constituting a combined image projected onto the screen 2120 through the projection lens 2114 via the shift device 2300 is referred to as a projection pixel, and the position of the projection pixel projected on the screen 2120 is referred to as a projection position.

Figure 2:
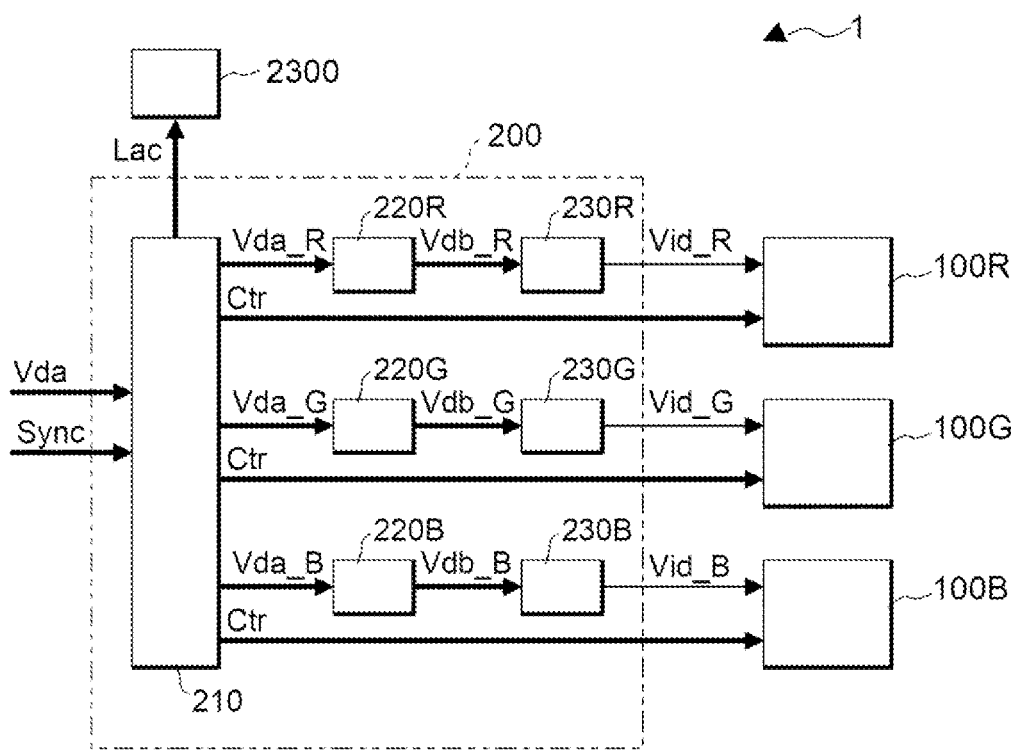
FIG. 2 is a block diagram illustrating a configuration of the liquid crystal projector.

FIG. 2 is a block diagram illustrating an electrical configuration of the liquid crystal projector 1. As illustrated in the drawing, the liquid crystal projector 1 includes a display control circuit 200, the liquid crystal panels 100R, 100G and 100B described above, and the shift device 2300.

Video data Vda is supplied synchronously with a synchronization signal Sync from a higher level device such as a host device that is not illustrated. The video data Vda designates, for each of the RGB, a gray scale level of a pixel in an image to be displayed, for example, by 8 bits.

Note that a pixel of an image for which gray scale level is designated by the video data Vda is referred to as a display pixel. In addition, a pixel represented by a pixel circuit of each of the liquid crystal panels 100R, 100G, and 100B is referred to as a panel pixel.

In a single unit of the liquid crystal panel 100R, 100G or 100B, the panel pixels are arranged in a matrix manner along the vertical axis and the horizontal axis. In the present embodiment, a color image projected on the screen 2120 is represented by combining, in other words, superimposing the individual transmitted images through the liquid crystal panels 100R, 100G, and 100B.

Thus, the pixel, which is the minimum unit of a color image, can be categorized into a sub-pixel of red through a liquid crystal panel 100R, a sub-pixel of green through the liquid crystal panel 100G, and a sub-pixel of blue through the liquid crystal panel 100B. However, when a specific color does not have to be mentioned and when only bright or dark is the matter to be considered, the sub-pixels in the liquid panels 100R, 100G, and 100B do not have to be referred to as a sub-pixel. Thus, in the present description, "pixel (panel pixel)" is used as the unit of display in each of the liquid crystal panels 100R, 100G, and 100B.

In addition, the density of array of display pixels for which gray scale level is designated by the video data Vda is, for example, twice in the vertical axis and twice in the horizontal axis, as compared with the density of array of panel pixels obtained by combining the liquid crystal panel 100R, 100G, or 100B.

The synchronization signal Sync includes a vertical synchronization signal that gives an instruction to start vertical scanning of the video data Vda, a horizontal synchronization signal that gives an instruction to start horizontal scanning, and a clock signal that indicates a timing at which one display pixel is supplied in the video data Vda.

The display control circuit 200 includes a video control circuit 210, processing circuits 220R, 220G, and 220B, and conversion circuits 230R, 230G, and 230B.

The video control circuit 210 stores one or a plurality of frame periods of video data Vda from among the video data Vda supplied from the higher level device. In addition, the video control circuit 210 divides the video data Vda for a frame period so as to correspond to the number of shifts of projection positions in one frame period by using a shift device 2300, which will be described later, and outputs them for each of the RGB. Note that, of the video data Vda outputted by the video control circuit 210, the component of R is denoted as video data Vda R, the component of G is denoted as video data Vda G, and the component of B is denoted as video data Vda B. When description is made without giving any specific color, the video data Vda is denoted as video data Vda.

In the first embodiment, the number of shifts of projection positions is four. Thus, the video control circuit 210 divides the video data Vda for a frame period into four so as to correspond to four unit periods. In addition, for each of the four unit periods, the video control circuit 210 divides the video data for each of the RGB to output them, and controls the shift device 2300 for each unit period so that the projection pixels onto the screen 2120 are located at projection positions that correspond to the unit periods.

It should be noted that projection positions in each of the unit periods will be described later. In addition, description will be made later as to which display pixel from among the display pixels designated in the video data Vda is represented by a panel pixel in the liquid crystal panel 100 at each of the projection positions.

The processing circuit 220R applies a correction process, which will be described later, to the video data Vda R, and outputs it as video data Vdb_R. The conversion circuit 230R converts the video data Vdb_R into a data signal Vid R that is an analog voltage, and supplies it to the liquid crystal panel 100R. Note that the processing circuit 220R includes, for example, a delay circuit for delaying the video data Vda R, and a central processing unit (processor) for comparing gray scale levels with each other and calculating a gray scale level.

Similarly, the processing circuit 220G applies a correction process to the video data Vda G, and outputs it as video data Vdb_G. The conversion circuit 230G converts the video data Vdb_G into a data signal Vid G that is an analog voltage, and supplies it to the liquid crystal panel 100G. The processing circuit 220B applies a correction processing to the video data Vda B, and outputs it as video data Vdb_B. The conversion circuit 230B converts the video data Vdb_B into a data signal Vid B that is an analog voltage, and supplies it to the liquid crystal panel 100B. The processing circuits 220G and 220B similarly each include a delay circuit and a processor. However, the delay circuit or the processor may be shared with the processing circuits 220R, 220G, and 220B.

Next, the liquid crystal panels 100R, 100G, and 100B will be described. The liquid crystal panels 100R, 100G, and 100B only differ in color of incident light, in other words, only differ in wavelength, and have the same structure. Thus, the reference characters of the liquid crystal panels 100R, 100G, and 100B are denoted as 100, and general description for the liquid crystal panels 100R, 100G, and 100B will be made without giving any specific color.

Figure 3:
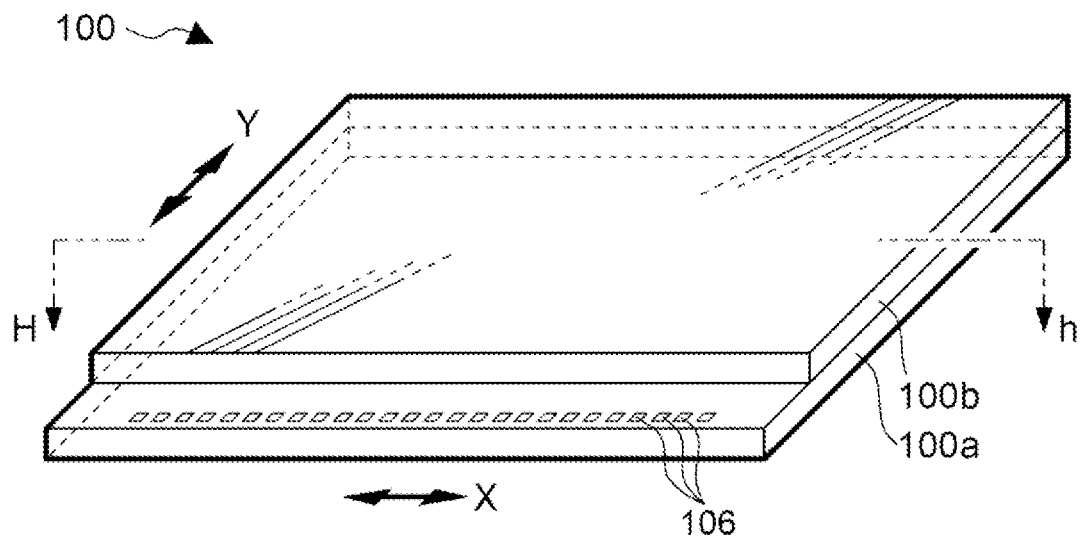
FIG. 3 is a perspective view of a configuration of a liquid crystal panel in the liquid crystal projector.
Figure 4:
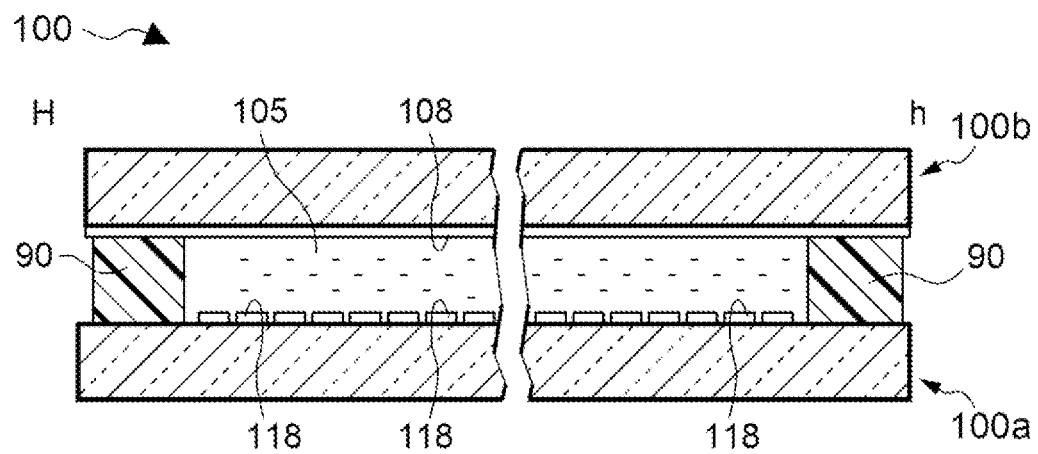
FIG. 4 is a cross-sectional view illustrating a structure of the liquid crystal panel.

FIG. 3 is a diagram illustrating a main part of the liquid crystal panel 100. FIG. 4 is a cross-sectional view taken along the line H-h in FIG. 3.

As illustrated in these drawings, in the liquid crystal panel 100, an element substrate 100a including a pixel electrode 118 and a counter substrate 100b including a common electrode 108 are attached to each other using a seal material 90 so that the surfaces of these substrates where the electrode is formed are opposed to each other with a certain gap being provided therebetween. A liquid crystal 105 is enclosed in this gap.

Glass, quartz or other substrates having optical transparency is used for the element substrate 100a and the counter substrate 100b. As illustrated in FIG. 3, one side of the element substrate 100a sticks out further than the counter substrate 100b. A plurality of terminals 106 is provided in this sticking-out region so as to be along the X-axis in the drawing. One end of a flexible printed circuit (FPC), which is not illustrated, is coupled to the plurality of terminals 106.

Note that the other end of the FPC board is coupled to the display control circuit 200, and various types of signals described above or the like are supplied to the liquid crystal panel 100.

On a surface of the element substrate 100a that is opposed to the counter substrate 100b, the pixel electrode 118 is formed through patterning, for example, of Indium Tin Oxide (ITO) or other conductive layers having a transparency.

Note that, in addition to the electrode, various types of elements are disposed on the opposing surface of the element substrate 100a and the opposing surface of the counter substrate 100b. However, these elements are not illustrated in the drawing.

Figure 5:
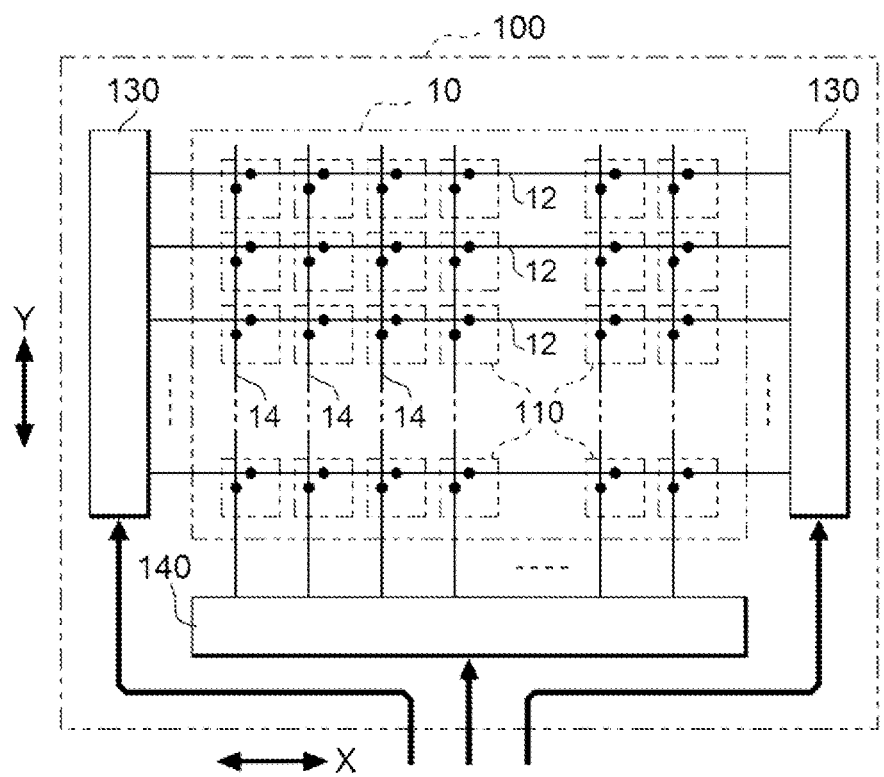
FIG. 5 is a block diagram illustrating an electrical configuration of the liquid crystal panel.

FIG. 5 is a block diagram illustrating the electrical configuration of the liquid crystal panel 100. Scanning line drive circuits 130 and a data-line drive circuit 140 are disposed at the periphery of the display region 10 of the liquid crystal panel 100.

In the display region 10 of the liquid crystal panel 100, pixel circuits 110 are arranged in a matrix manner. Specifically, in the display region 10, a plurality of scanning lines 12 is provided so as to extend along the X axis in the drawing. In addition, a plurality of data lines 14 is provided so as to extend along the Y axis and be electrically insulated from the scanning lines 12. In addition, the pixel circuits 110 are provided in a matrix manner so as to correspond to intersections between the plurality of scanning lines 12 and the plurality of data lines 14.

The pixel circuits 110 are arranged in a matrix manner with m rows in the vertical direction and n columns in the horizontal direction, where "m" is the number of scanning lines 12 and "n" is the number of data lines 14. Both of the "m" and the "n" are integers equal to or greater than 2. In connection with the scanning line 12 and the pixel circuit 110, the row may be referred to as a first, second, third, . . ., (m−1)-th, or m-th row from the top in the drawing in order to identify individual rows in the matrix. Similarly, in connection with the data line 14 and the pixel circuit 110, the column may be referred to as a first, second, third, . . . , (n−1)-th, or n-th column sequentially from the left in the drawing in order to identify individual columns in the matrix.

In accordance with control by the video control circuit 210, the scanning line drive circuit 130 selects a scanning line 12 on a one-by-one basis sequentially in an order, for example, of the first row, the second row, the third row, . . ., and the m-th row, and sets an H level for a scanning signal delivered to the selected scanning line 12. Note that the scanning line drive circuit 130 sets an L level for the scanning signal delivered to scanning lines 12 other than the selected scanning line 12.

The data-line drive circuit 140 latches one row of a data signal supplied from a circuit of a corresponding color from among the processing circuits 220R, 220G, and 220B. In addition, in a period when the scanning signal to the scanning line 12 is set to the H level, the data-line drive circuit 140 outputs the data signal through the data line 14 to a pixel circuit 110 located at the scanning line 12.

Figure 6:
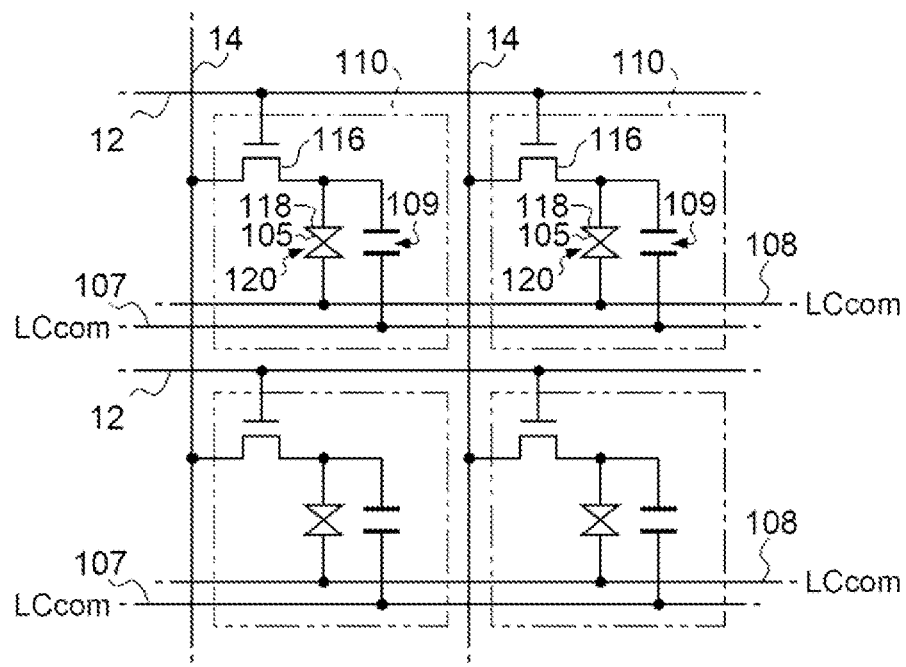
FIG. 6 is a diagram illustrating a configuration of a pixel circuit in the liquid crystal panel.

FIG. 6 is a diagram illustrating an equivalent circuit of four pixel circuits 110 arranged in two columns and two rows so as to correspond to intersections of two adjacent scanning lines 12 and two adjacent data lines 14.

As illustrated in the drawing, the pixel circuits 110 each includes a transistor 116 and a liquid crystal element 120. The transistor 116 is, for example, an n-channel thin film transistor. In the pixel circuit 110, a gate node of the transistor 116 is coupled to the scanning line 12. In addition, a source node thereof is coupled to the data line 14, and a drain node thereof is coupled to a pixel electrode 118 having a substantially square shape in plan view.

A common electrode 108 is provided so as to be opposed to the pixel electrode 118 and be shared with all the pixels. A voltage LCcom is applied to the common electrode 108. In addition, the liquid crystal 105 is interposed between the pixel electrode 118 and the common electrode 108 as described above. Thus, the liquid crystal element 120 including the liquid crystal 105 interposed between the pixel electrode 118 and the common electrode 108 is configured for each of the pixel circuits 110.

In addition, a storage capacitor 109 is provided in parallel to the liquid crystal element 120. One end of the storage capacitor 109 is coupled to the pixel electrode 118, whereas the other end thereof is coupled to capacitance line 107. A voltage that is constant in terms of time, for example, the voltage LCcom that is the same as the voltage applied to the common electrode 108 is applied to the capacitance line 107. Since the pixel circuits 110 are arranged in a matrix manner along the X axis in which the scanning line 12 extends and the Y axis in which the data lines 14 extend, the pixel electrodes 118, which are included in the pixel circuits 110, are also arranged along the Y axis and the X axis.

Upon the scanning signal of a scanning line 12 being set at the H level, the transistor 116 of the pixel circuit 110 provided so as to correspond to this scanning line 12 is turned on. With the transistor 116 having been turned on, the data line 14 and the pixel electrode 118 are brought into an electrically coupled state. This allows the data signal supplied to the data line 14 to reach the pixel electrode 118 through the transistor 116 that has been turned on. When the scanning line 12 falls to the L level, the transistor 116 is turned off. However, the voltage of the data signal that has reached the pixel electrode 118 is retained by the capacitance of the liquid crystal element 120 and the storage capacitor 109.

It is well known that, in the liquid crystal element 120, the orientation of liquid crystal molecules changes in accordance with the electric field generated by the pixel electrode 118 and the common electrode 108. Thus, the liquid crystal element 120 has a transmittance corresponding to an effective value of the applied voltage.

Note that a region of the liquid crystal element 120 that functions as a panel pixel, in other words, a region that has a transmittance corresponding to the effective value of the voltage is a region where the pixel electrode 118 and the common electrode 108 overlap with each other when the element substrate 100a and the counter substrate 100b are in plan view. Since the pixel electrode 118 has a substantially square shape in plan view, the shape of the panel pixel of the liquid crystal panel 100 is also substantially square.

In addition, the present embodiment employs a normally black mode in which the transmittance increases as the voltage applied to the liquid crystal element 120 increases.

The operation of supplying the data signal to the pixel electrode 118 of the liquid crystal element 120 is performed in the order of the first, second, third, . . . , and m-th rows. Thus, the voltage corresponding to the data signal is retained by each of the liquid crystal elements 120 of the pixel circuits 110 arranged in m rows and n columns. As the voltage is retained in such a manner, each of the liquid crystal elements 120 has a targeted transmittance. In addition, the panel pixels arranged in m rows and n columns are used to generate a transmitted image having a corresponding color.

Next, description will be made of a relationship between the display pixels in the image to be displayed, the panel pixels of the liquid crystal panel 100, and the shift of the optical axis by the shift device 2300. Note that, while the shift device 2300 shifts the optical axis extending in the emission direction from the dichroic prism 2112 as described above, the amount of shift will be described on the basis of the length of one side of a panel panel pixel, for the purpose of convenience.

Figure 7:
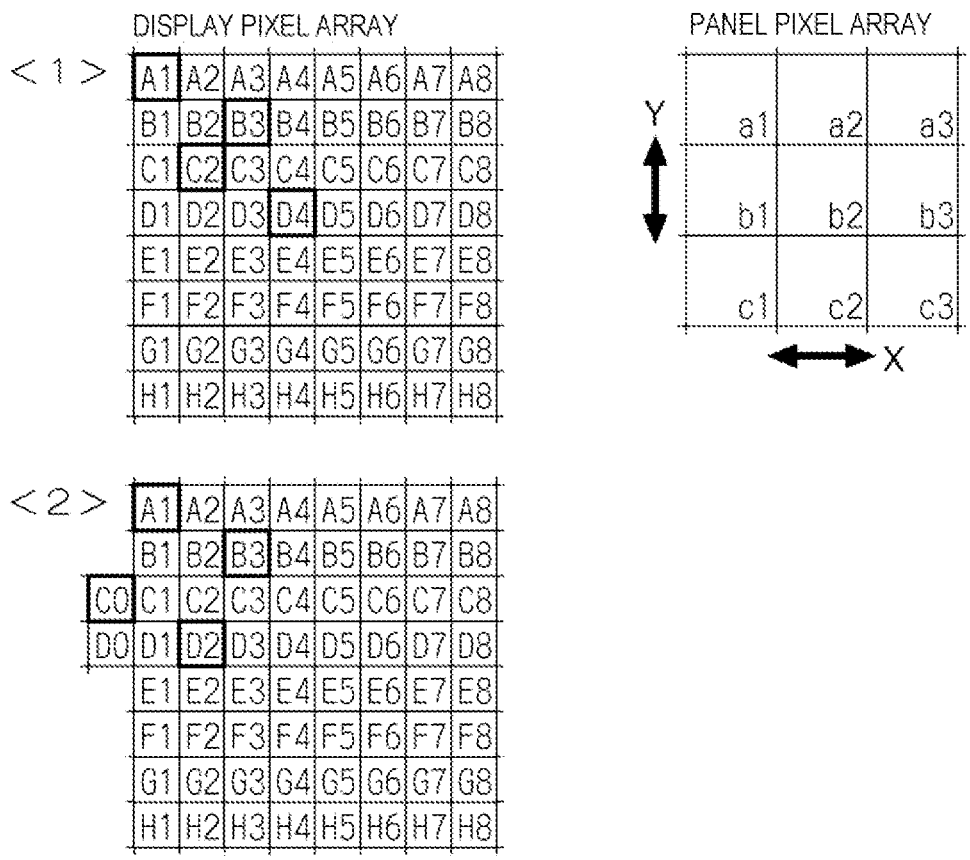
FIG. 7 is a diagram illustrating, for example, a relationship between a display pixel array and a panel pixel array.

FIG. 7 is a diagram illustrating, for example, a relationship between the display pixel array and the panel pixel array. Here, the "display pixel array" indicates an arrangement of display pixels for which gray scale levels are designated by the video data Vda. The "panel pixel array" indicates an arrangement of pixel circuits 110 of the liquid crystal panel 100, that is, an arrangement of panel pixels. Note that FIG. 7 illustrates an array of display pixels that are extracted partially from among the array of display pixels designated by the video data Vda and to be displayed. In addition, FIG. 7 illustrates a panel pixel array obtained by extracting an array of panel pixels that correspond to part the display pixel array, from among the array of pixel circuits in the liquid crystal panel 100.

Note that, in order to identify a plurality of display pixels included in an image designated by the video data Vda so as to be distinguished from panel pixels in the liquid crystal panel 100, reference characters are attached to individual display pixels in a manner such that display pixels in the first row are denoted as A1, A2, . . . , A8, display pixels in the second row are denoted as B1, B2, . . . , B8, and display pixels in the third row are denoted as C1, C2, . . . , C8. After this, reference characters are similarly denoted, and display pixels in the eighth row are denoted as H1, H2, . . . , H8.

In addition, in order to identify a plurality of panel pixels included in the liquid crystal panel 100 so as to be distinguished from the display pixels, reference characters are attached to individual panel pixels in a manner such that panel pixels in the first row are denoted as a1, a2, a3, and panel pixels in the second row are denoted as b1, b2, b3, and panel pixels in the third row are denoted as c1, c2, c3.

As described above, in the present embodiment, the density of array of display pixels for which gray scale levels are designated by the video data Vda is twice in the vertical axis and twice in horizontal axis, as compared with the density of array of panel pixels in the liquid crystal panel 100. Thus, one panel pixel in the liquid crystal panel 100 represents, in a time-division manner, four display pixels designated by the video data Vda. Specifically, in the present embodiment, the frame period is divided into four unit periods, and one panel pixel in the liquid crystal panel 100 represents the four display pixels while the projection positions are being shifted for each of the unit periods.

Note that "a panel pixel represents display pixels" means that a data signal that corresponds to a display pixel designated by the video data Vda and also corresponds to a gray scale level designated by the video data Vda is supplied to a panel pixel to cause this panel pixel to have a transmittance corresponding to the gray scale level of the display pixel.

In addition, the "frame period" means a period of time required to display one frame of an image designated by the video data Vda. In other words, it means a period of time required for one panel pixel to represent four display pixels in a time-division manner. When the length of one frame period is equal to the vertical synchronization period, for example, when the frequency of the vertical synchronization signal included in the synchronization signal Sync is 60 Hz, the period is 16.7 milliseconds corresponding to one period of the vertical synchronization signal.

Figure 8:
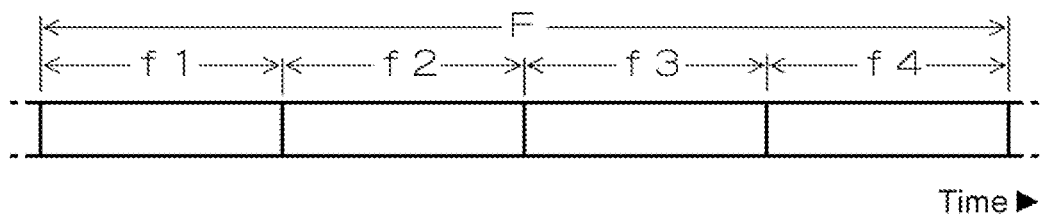
FIG. 8 is a diagram illustrating a frame period and a unit period in the liquid crystal projector.

FIG. 8 is a diagram used to explain the frame period and the unit period according to the first embodiment. As illustrated in this drawing, the frame period F in the present exemplary embodiment is divided into four unit periods. In order to conveniently identify the four unit periods in the frame period F, reference characters are attached as f1, f2, f3, and f4 in the order of time.

In the present embodiment, in the frame period F, four display pixels A1, C2, D4, and B3 indicated by the thick frame in <1> of FIG. 7 are represented by one panel pixel a1 in the liquid crystal panel 100.

Note that, for the purpose of convenience, focus is placed on the four display pixels A1, C2, D4, and B3 represented by the panel pixel a1 with the thick frame in <1> of FIG. 7. The other panel pixels similarly represent other display pixels. For example, the panel pixel a2 represents four display pixels A3, C4, D6, and B5, and the panel pixel b1 represents four display pixels C1, E2, F4, and D3.

Figure 9:
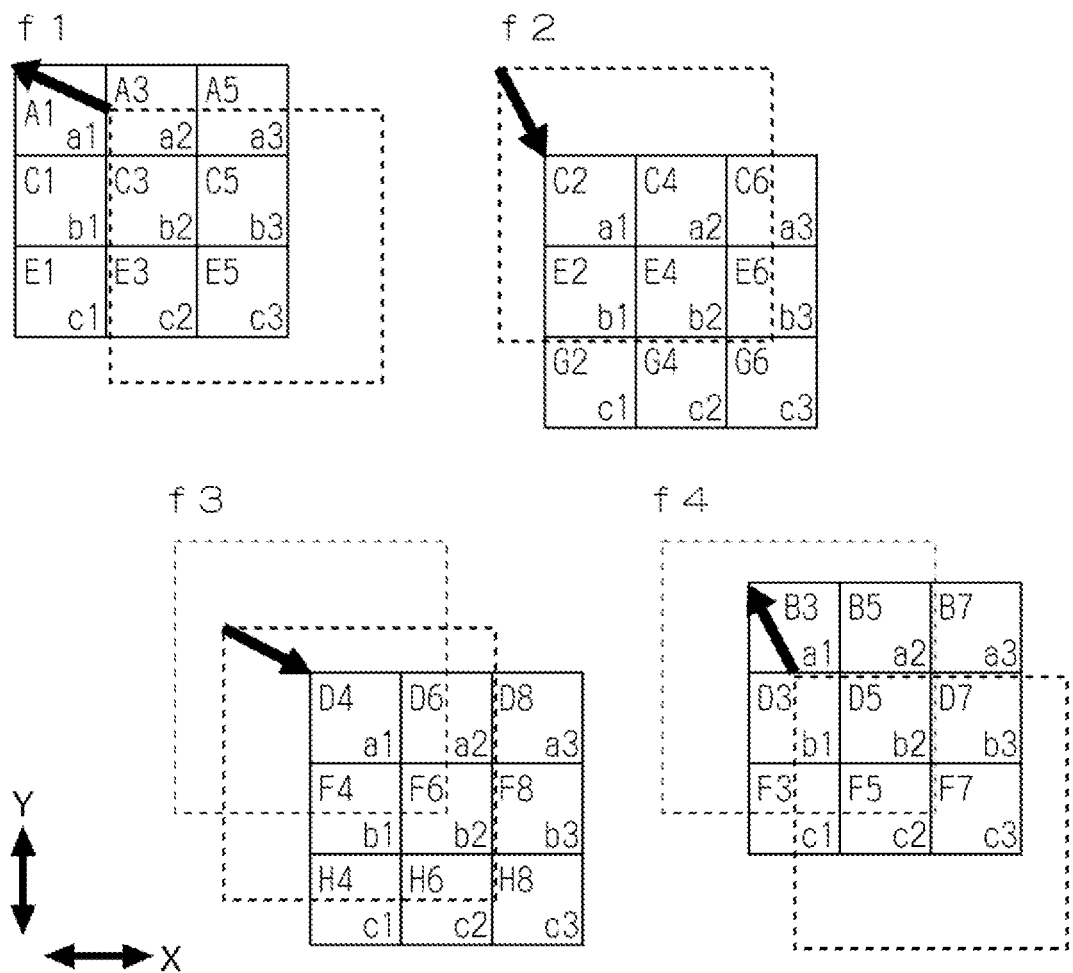
FIG. 9 is a diagram illustrating a relationship between display pixels and projection positions of panel pixels.
Figure 10:
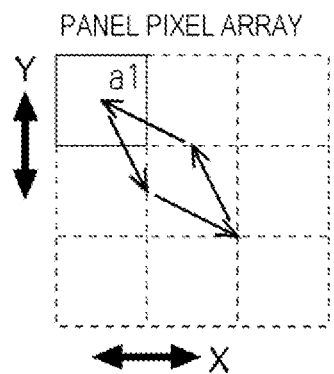
FIG. 10 is a diagram illustrating operation of a shift device.

FIG. 9 is a diagram illustrating, for each unit period, a relationship between the panel pixel in the liquid crystal panel 100, the display pixel represented by the panel pixel, and the projection position of the display pixel, in accordance with the first embodiment. Specifically, FIG. 9 is a diagram illustrating how nine panel pixels in the liquid crystal panel 100 in FIG. 7 represent which display pixel for each unit period, and how the projection positions are shifted. In addition, FIG. 10 is a diagram used to explain the shift of projection positions by the shift device 2300 on the basis of the panel pixel a1.

During the unit period f1 in the frame period F, the panel pixels a1, a2, a3, b1, b2, b3, c1, c2, and c3 in the liquid crystal panel 100 represent the display pixels A1, A3, A5, C1, C3, C5, E1, E3, and E5, respectively.

During the unit period f2, the shift device 2300 shifts projection positions from the projection positions at the unit period f1 indicated by the thick dashed line by 0.5 pixel of a panel pixel to the right direction of the right in the X axis and by 1.0 pixel of a panel pixel in the downward direction in the Y axis. In addition, during the unit period f2, the panel pixels a1, a2, a3, b1, b2, b3, c1, c2, and c3 represent the display pixels C2, C4, C6, E2, E4, E6, G2, G4, and G6, respectively.

During the unit period f3, the shift device 2300 shifts projection positions from the projection positions at the unit period f2 indicated by the thick dashed line by 1.0 pixel of a panel pixel to the right in the X axis and by 0.5 pixel of a panel pixel in the downward direction in the Y axis. Note that the thin dashed line indicates a shift position in the unit period f1. In addition, during the unit period f3, the panel pixels a1, a2, a3, b1, b2, b3, c1, c2, and c3 represent the display pixels D4, D6, D8, F4, F6, F8, H4, H6, and H8, respectively.

During the unit period f4, the shift device 2300 shifts projection positions from the projection positions at the unit period f3 indicated by the thick dashed line by 0.5 pixel of a panel pixel to the left in the X axis and by 1.0 pixel of a panel pixel in the upward direction in the Y axis. In addition, during the unit period f4, the panel pixels a1, a2, a3, b1, b2, b3, c1, c2, and c3 represent the display pixels B3, B5, B7, D3, D5, D7, F3, F5, and F7, respectively.

During the unit period f1 in the following frame period F after the unit period f4, the shift device 2300 shifts projection positions from the projection position in the unit period f4 indicated by the dashed line by 1.0 pixel of a panel pixel to the left in the X axis and by 0.5 pixel of a panel pixel in the upward direction in the Y axis, thereby returning to the positions at the unit period f1.

A reduction in display quality due to orientation failure will be described.

Figure 11:
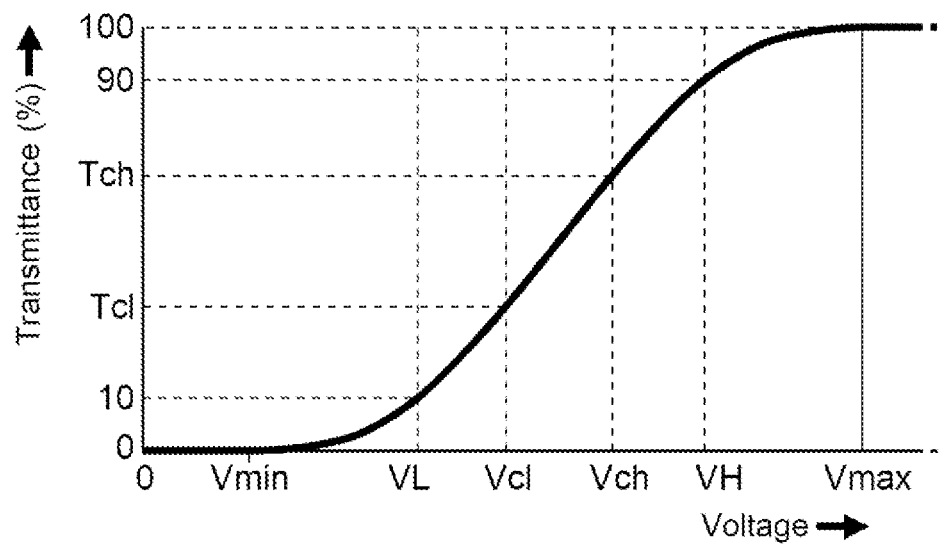
FIG. 11 is a diagram illustrating one example of a characteristic concerning voltage-transmittance of a liquid crystal element in the liquid crystal panel.

FIG. 11 is a diagram illustrating one example of a characteristic (V-T characteristic) between the applied voltage and the transmittance of the liquid crystal element 120 in the normally black mode. In the normally black mode, a high applied voltage is applied in the liquid crystal element 120 to a panel pixel (bright pixel) for which a high gray scale level is designated and that has a high transmittance. On the other hand, a low applied voltage is applied in the liquid crystal element 120 to a panel pixel (dark pixel) for which a low gray scale level is designated and that has a low transmittance. The bright pixel and the dark pixel as described above are defined in the following manner for the purpose of convenience.

When a voltage corresponding to a gray scale level is applied to a pixel electrode 118, the bright pixel is a pixel in which the applied voltage to a liquid crystal element 120 including the pixel electrode 118 exceeds VH, and the dark pixel is a pixel in which the applied voltage to the liquid crystal element 120 is less than VL. Here, the VH and the VL have a relationship of VH>VL. In addition, when the applied voltage to the liquid crystal element 120 is the voltage VL, the relative transmittance is 10%, for example. When the applied voltage is the voltage VH, the relative transmittance is 90%, for example. However, a voltage corresponding to other relative transmittances may be used for the VL and the VH.

Figure 12:
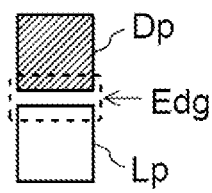
FIG. 12 is a diagram used to explain an example of occurrence of orientation failure.

When the bright pixel Lp and the dark pixel Dp adjoin each other in the liquid crystal panel 100 as illustrated in FIG. 12, a difference in voltage between pixel electrodes 118 increases. This makes an orientation failure of liquid crystal molecules more likely to occur due to a horizontal electric field in the vicinity of the boundary Edg between the two pixels. In general, as a difference in voltage between pixel electrodes 118 increases, the degree of orientation failure occurring in the vicinity of the boundary between two adjacent pixels increases. A pixel having an orientation failure occurring therein does not have a transmittance corresponding to a gray scale level, which causes a reduction in display quality.

For the purpose of convenience, a comparative example will be described before description will be made that a reduction in display quality is suppressed due to an orientation failure according to the present embodiment.

Figure 20:
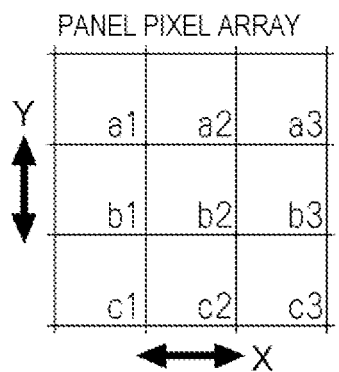
FIG. 20 is a diagram illustrating, for example, a relationship between a display pixel array and a panel pixel array according to a comparative example.

FIG. 20 is a diagram used to explain, for example, a relationship between the display pixel array and the panel pixel array according to the comparative example. In the comparative example, during the frame period F, four display pixels A1, A2, B2, and B1 indicated by the thick frame in the display pixel array in the drawing are represented by one panel pixel a1 in the liquid crystal panel 100.

Figure 21:
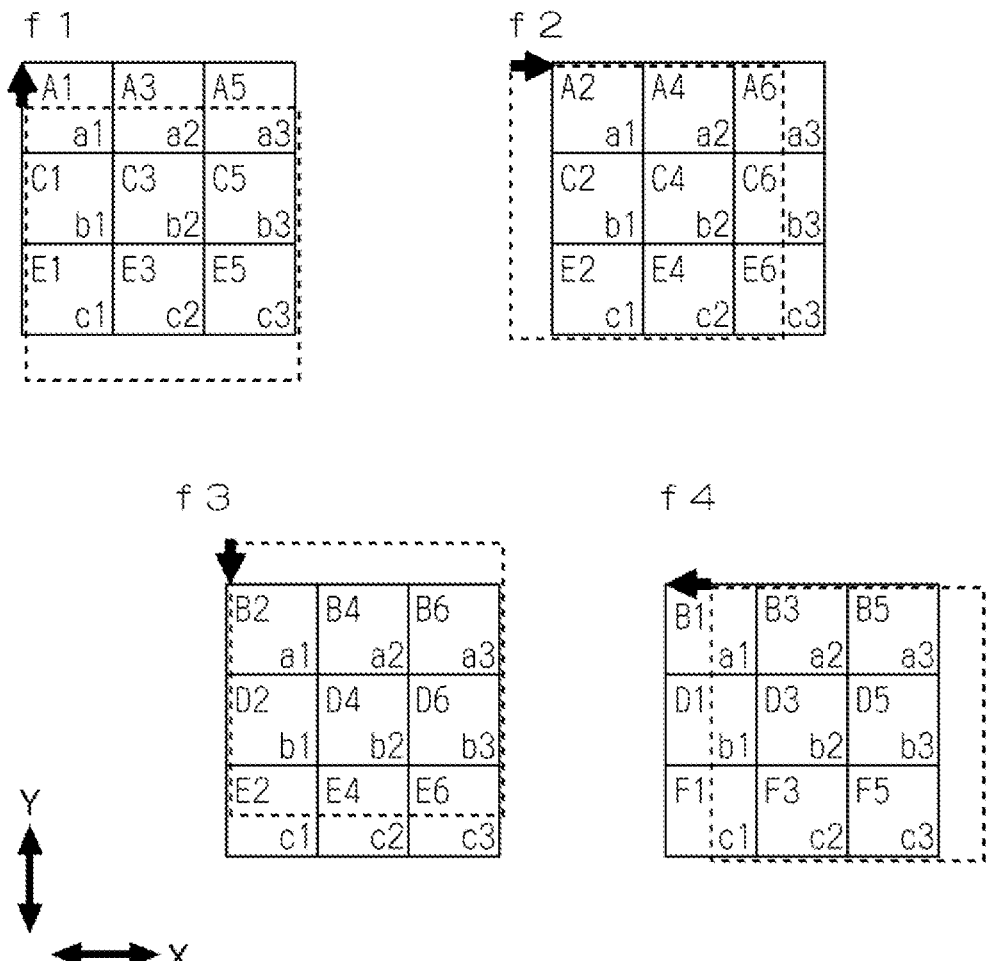
FIG. 21 is a diagram illustrating a relationship between display pixels and projection positions of panel pixels according to a comparative example.
Figure 22:
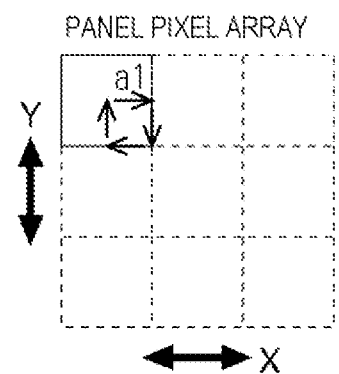
FIG. 22 is a diagram illustrating operation of a shift device according to a comparative example.

FIG. 21 is a diagram illustrating, for each unit period, a relationship between the panel pixel in the liquid crystal panel 100, the display pixel represented by the panel pixel, and the projection position of the display pixel in the comparative example. In addition, FIG. 22 is a diagram used to explain the shift of projection positions by the shift device 2300 with the panel pixel a1 being the reference.

In the comparative example, during the unit period f1 in the frame period F, the panel pixels a1, a2, a3, b1, b2, b3, c1, c2, and c3 in the liquid crystal panel 100 represent the display pixels A1, A3, A5, C1, C3, C5, E1, E3 and E5, respectively.

During the unit period f2, the shift device 2300 shifts projection positions by 0.5 pixel of a panel pixel to the right in the X axis from the projection positions at the unit frame f1 indicated by the dashed line. In addition, during the unit period f2, the panel pixels a1, a2, a3, b1, b2, b3, c1, c2, and c3 represent the display pixels A2, A4, A6, C2, C4, C6, E2, E4 and E6, respectively.

During the unit period f3, the shift device 2300 shifts projection positions by 0.5 pixel of a panel pixel in the downward direction in the Y axis from the projection positions at the unit frame f2. In addition, during the unit period f3, the panel pixels a1, a2, a3, b1, b2, b3, c1, c2, and c3 represent the display pixels B2, B4, B6, D2, D4, D6, E2, E4 and E6, respectively.

During the unit period f4, the shift device 2300 shifts projection positions by 0.5 pixel of a panel pixel to the left in the X axis from the projection positions at the unit period f3 indicated by the dashed line. In addition, in the unit period f4, the panel pixels a1, a2, a3, b1, b2, b3, c1, c2, and c3 represent the display pixels B1, B3, B5, D1, D3, D5, F1, F3, and F5, respectively.

During the unit period f1 in the following frame period F after the unit period f4, the shift device 2300 shifts projection positions by 0.5 pixel of a panel pixel in the upward direction in the Y axis from the projection position in the unit period f4 indicated by the dashed line, thereby returning to the position in the unit period f1.

With the comparative example, it is possible to represent display pixels with a density of array that is twice in the vertical axis and twice in the horizontal axis with respect to the density of array of the panel pixels, as with the embodiment. However, with the comparative example, the display quality reduces in the following case. Specifically, the display quality reduces when part of an image designated by the video data Vda is set such that the display pixels C1 to C8 are designated to be dark with the background thereof being set to be bright display pixels, as indicated in the display pixel array in FIG. 13.

Figure 23:
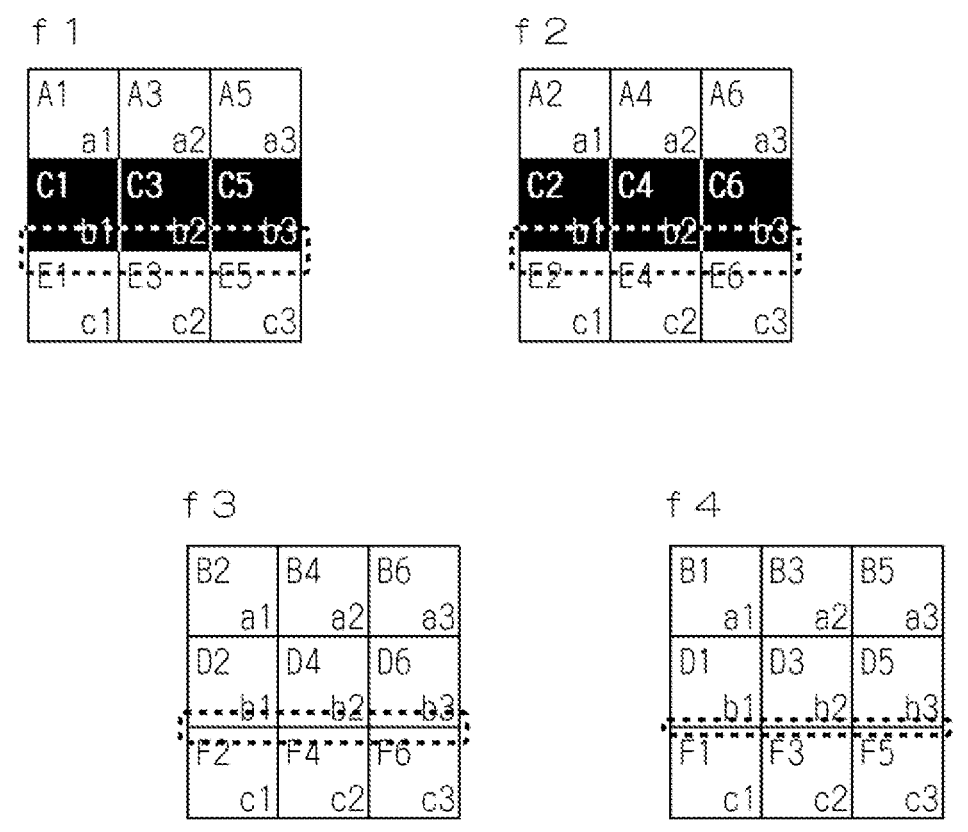

In the comparative example, during the unit period f1, the panel pixels b1, b2, and b3 in the liquid crystal panel 100 represent the display pixels C1, C3, and C5, respectively, designated to be dark pixels, as illustrated in FIG. 23. Next, during the unit period f2, the panel pixels b1, b2, and b3 in the liquid crystal panel 100 represent the display pixels C2, C4, and C6, respectively, designated to be dark pixels. No specific explanation will be necessary for the other unit periods f3 and f4.

Figure 13:
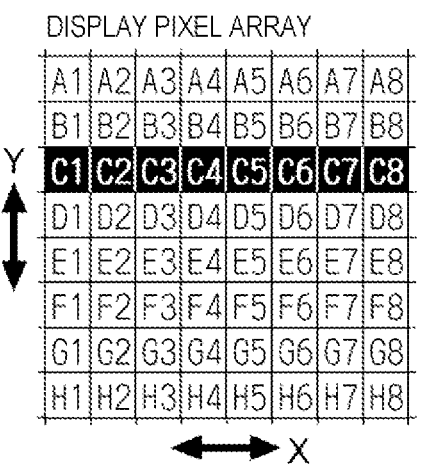
FIG. 13 is a diagram illustrating an example of a display pixel array based on video data.

In the comparative example, when the display pixels as illustrated in FIG. 13 are represented by the panel pixels in the liquid crystal panel 100, bright pixels and dark pixels adjoin each other in the consecutive unit periods f1 and f2 as illustrated in FIG. 23. Thus, an orientation failure occurs at or near the boundary between the adjacent portions, as indicated by the dashed line. Specifically, in the unit period f1, an orientation failure occurs at the boundary between the panel pixels b1 to b3 and the panel pixels c1 to c3. In addition, in the unit period f2, an orientation failure continues to occur at the boundary between the same panel pixels.

Note that illustration of the orientation failure is made only at or near the boundary between the panel pixels b1 to b3 and the panel pixels c1 to c3. However, in actuality, the orientation failure also occurs at or near the boundary between the panel pixels b1 to b3 and the panel pixels a1 to a3.

In the unit periods f3, f4, the panel pixels do not represent the display pixels C1 to C6 designated to be dark pixels, and only represent bright pixels. However, since the orientation failure at the boundary between the panel pixels b1 to b3 and the panel pixels c1 to c3 occurs in two consecutive unit periods f1 and f2, the degree of orientation failure is large. Thus, in the unit period f3, the orientation failure that has occurred does not immediately vanish, and remains even after the panel pixels b1 to b3 change into bright pixels. In the unit period f4, although the degree of orientation failure is smaller than that in the unit period f3, the orientation failure still remains.

Figures 14, 15:
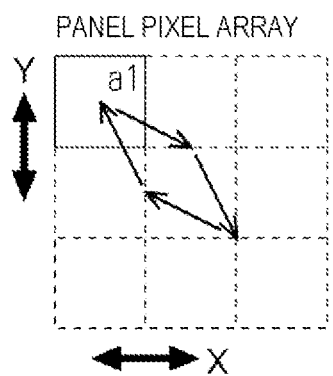
FIG. 14 is a diagram used to explain an example of occurrence of orientation failure.
FIG. 15 is a diagram illustrating another operation of the shift device.

In contrast, in a case of the present embodiment, when part of an image designated by the video data Vda includes the display pixel array as illustrated in FIG. 13, nine panel pixels in the liquid crystal panel 100 represent the display pixels as illustrated in FIG. 14 for each of the unit periods.

In the present embodiment, during the unit period f1, the panel pixels b1 to b3 that are dark pixels and the panel pixels c1 to c3 that are bright pixels also adjoin each other, as with the comparative example. Thus, an orientation failure occurs at or near the boundary, as indicated by the dashed line.

In addition, during the unit period f2, the panel pixels a1 to a3 that are dark pixels and the panel pixels b1 to b3 that are bright pixels also adjoin each other. Thus, an orientation failure occurs at or near the boundary therebetween, as indicated by the dashed line.

However, in a case of the present embodiment, the orientation failure that occurs in the unit period f1 at the boundary between the panel pixels b1 to b3 and the panel pixels c1 to c3 only occurs during the unit period f1, and hence, the degree of orientation failure is small. Thus, during the unit period f2, the degree thereof is small when the panel pixels b1 to b3 change into the bright pixels.

The orientation failure that occurs in the unit period f2 at the boundary between the panel pixels a1 to a3 and the panel pixels b1 to b3 only occurs during this unit period f2, and hence, the degree thereof is small. Thus, during the unit period f3, the degree thereof is small when the panel pixels a1 to a3 change into the bright pixels.

As a result, in the present embodiment, when the display pixel array in FIG. 13 is represented by nine panel pixels in the liquid crystal panel 100, the orientation failure that occurs in a certain unit period decreases to vanish after the unit period elapses. In a case of the present embodiment, this results in a decrease in the degree of occurrence of the orientation failure, which makes it possible to suppress a reduction in the display quality, as compared with the comparative example.

In other words, in a case of the present embodiment, during one frame period f, four display pixels represented by one panel pixel are not adjacent to each other along the X axis and are not adjacent to each other along the Y axis, as illustrated in <1> of FIG. 7. In other words, in the present embodiment, four display pixels represented by one panel pixel are in a non-adjacent relationship in the X axis and the Y axis. Thus, when display pixels are arranged in a manner such that a dark display pixel and a bright display pixel adjoin each other along the Y axis, and continue along the X axis as illustrated in FIG. 13, the liquid crystal panel 100 during one certain unit period falls into a state in which one of two adjacent panel pixels is a dark pixel, and the other is a bright pixel, and during the next unit period, this state ends.

Thus, in the present embodiment, when the display pixel is in the array described above, a state in which a dark pixel and a bright pixel adjoin each other does not occur continuously in two or more unit periods, and hence, it is possible to suppress a reduction in the display quality.

Note that the embodiment has been described by giving an example of display pixels employing the array as illustrated in FIG. 13. The embodiment, however, similarly applies to a case where a dark display pixel and a bright display pixel adjoin each other along the X axis, and continue along the Y axis.

In the present embodiment, from a certain unit period to the following unit period, the shift device 2300 shifts projection positions by 0.5 pixel of a panel pixel in either one of the X axis and the Y axis and by 1.0 pixel of a panel pixel in the other one of the X axis and the Y axis. In other words, from a certain unit period to the next unit period, the amount (magnitude) of shift by the shift device 2300 is 1.12 ($\cong\{0.5^2+1.0^2\}^{1/2}$) pixel in terms of a panel pixel, and is constant.

Thus, in the present embodiment, an influence occurring when the shift operation by the shift device 2300 is slow is substantially equal in the individual unit periods. Thus, a reduction in the display quality due to this influence can be made less noticeable.

Note that, in the first embodiment, the panel pixel a1 represents the display pixels in the order of A1, C2, D4, and B3. However, the panel pixel a1 may represent the display pixels in the reverse order of A1, B3, D4, and C2. When the display pixels are represented in the reverse order, the shift operation by the shift device 2300 is performed in the manner illustrated in FIG. 15 with the panel pixel a1 being the reference.

Next, a liquid crystal projector 1 according to a second embodiment will be described.

The second embodiment differs from the first embodiment only in the four display pixels represented by one panel pixel and the shift operation by the shift device 2300, and has a structure and a configuration of the liquid crystal projector similar to those of the first embodiment. Thus, the second embodiment will be described with focus being placed on points different from the first embodiment.

Figure 16:
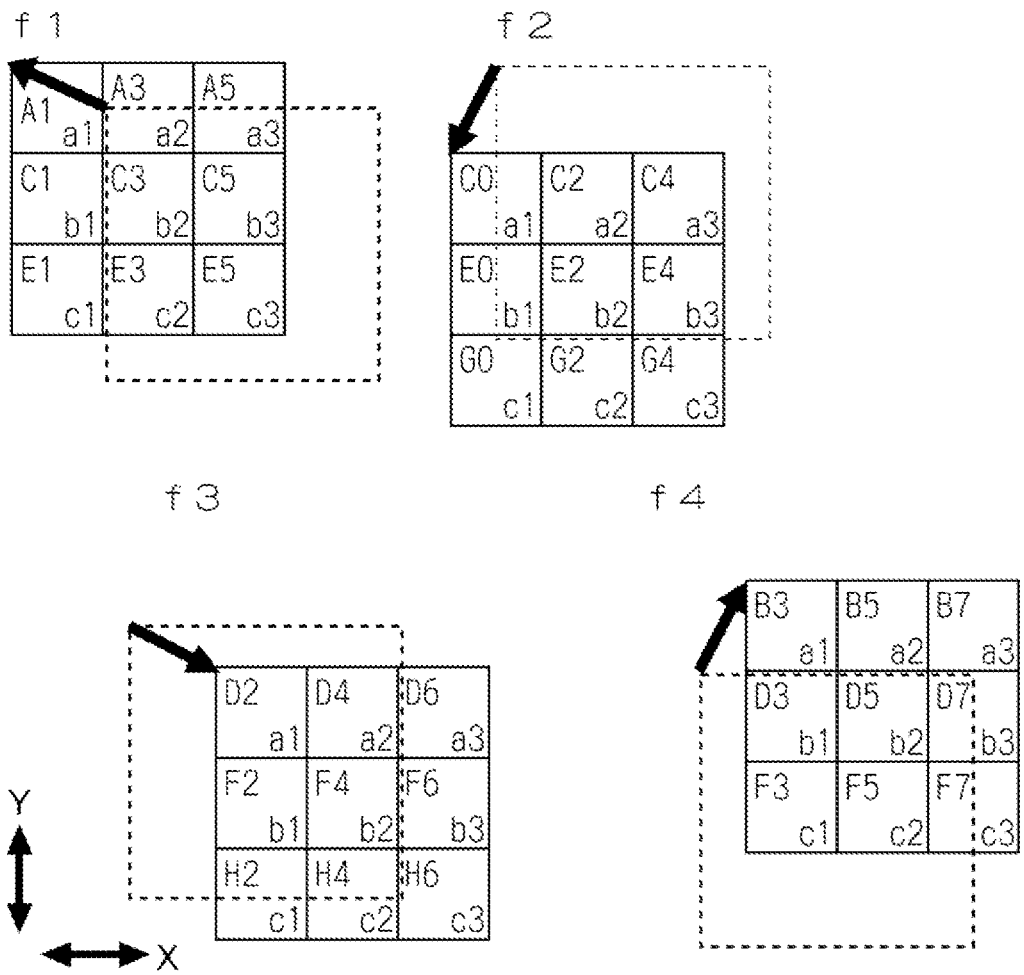
FIG. 16 is a diagram illustrating a relationship between display pixels and projection positions of panel pixels according to a second embodiment.
Figure 17:
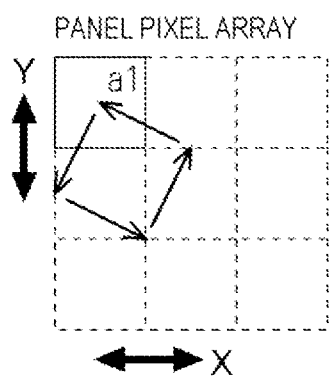
FIG. 17 is a diagram illustrating operation of a shift device.

FIG. 16 is a diagram illustrating, for each unit period, a relationship between the panel pixel in the liquid crystal panel 100, the display pixels represented by the panel pixel, and the projection positions of the display pixels, in accordance with the second embodiment. FIG. 17 is a diagram used to explain the shift of the projection position by the shift device 2300 with the panel pixel a1 being the reference.

In the second embodiment, in the frame period F, four display pixels A1, C0, D2, and B3 illustrated by the thick frame in the <2> of FIG. 7 are represented by one panel pixel a1 in the liquid crystal panel 100.

During the unit period f1 in the frame period F, the panel pixels a1, a2, a3, b1, b2, b3, c1, c2, and c3 in the liquid crystal panel 100 represent the display pixels A1, A3, A5, C1, C3, C5, E1, E3 and E5, respectively.

During the unit period f2, the shift device 2300 shifts projection position from the projection position in the unit period f1 indicated by the dashed line by 0.5 pixel of a panel pixel to the left in the X axis and by 1.0 pixel of a panel pixel in the downward direction in the Y axis. In addition, during the unit period f2, the panel pixels a1, a2, a3, b1, b2, b3, c1, c2, and, c3 represent the display pixels C0, C2, C4, E0, E2, E4, G0, G2, and G4, respectively.

During the unit period f3, the shift device 2300 shifts projection positions from the projection positions at the unit period f2 indicated by the dashed line, by 1.0 pixel of a panel pixel to the right in the X axis and by 0.5 pixel of a panel pixel in the downward direction in the Y axis. In addition, during the unit period f3, the panel pixels a1, a2, a3, b1, b2, b3, c1, c2, and c3 represent the display pixels D2, 4, D6, F2, F4, F6, H2, H4, and H6, respectively.

During the unit period f4, the shift device 2300 shifts projection positions from the projection position in the unit period f3 indicated by the dashed line, by 0.5 pixel of a panel pixel to the right in the X axis and by 1.0 pixel of a panel pixels in the upward direction in the Y axis. In addition, during the unit period f4, the panel pixels a1, a2, a3, b1, b2, b3, c1, c2, and c3 represent the display pixels B3, B5, B7, D3, D5, D7, F3, F5 and F7, respectively.

During the unit period f1 in the following frame period F after the unit period f4, the shift device 2300 shifts projection positions from the projection position in the unit period f4 indicated by the dashed line by 1.0 pixel of a panel pixel to the left in the X axis and by 0.5 pixel of a panel pixel in the upward direction in the Y axis, thereby returning to the positions at the unit period f1.

In the second embodiment, as illustrated in <2> of FIG. 7, during one frame period F, four display pixels represented by one panel pixel are not adjacent to each other along the X axis and are not adjacent to each other along the Y axis. Thus, as in the first embodiment, in a case of the second embodiment, when display pixels are arranged in a manner such that a dark display pixel and a bright display pixel adjoin each other along the Y axis and continue along the X axis as illustrated in FIG. 13, the liquid panel 100 during one certain unit period falls into a state in which one of two adjacent panel pixels is a dark pixel and the other is a bright pixel, and during the next unit period, this state ends (specific illustration is not given).

As in the first embodiment, in a case of the second embodiment, from a certain unit period to the following unit period, the shift device 2300 shifts projection positions by 0.5 pixel of a panel pixel in either one of the X axis and the Y axis and by 1.0 pixel of a panel pixel in the other one of the X axis and the Y axis. Thus, in the second embodiment, an influence occurring when the shift operation by the shift device 2300 is slow is substantially equal in the individual unit periods. This makes it possible to make less noticeable a reduction in the display quality due to this influence.

Furthermore, the second embodiment sets 90 degrees for an angle formed by a direction in which the shift device 2300 shifts from the projection positions at a certain unit period to the projection positions at the following unit period and a direction in which the shift device 2300 shifts from the projection positions at this following unit period to the projection positions at the next following unit period.

For example, 90 degrees are set for an angle formed by a direction in which the projection positions at the unit period f1 are shifted to the projection positions at the unit period f2 and a direction in which the projection positions at the unit period f2 are shifted to the projection positions at the unit period f3. In addition, 90 degrees are also set for an angle formed by a direction in which the projection positions at the unit period f2 are shifted to the projection positions at the unit period f3 and a direction in which the projection positions at the unit period f3 are shifted to the projection positions at the unit period f4. Furthermore, 90 degrees are also set for an angle formed by a direction in which the projection positions at the unit period f3 are shifted to the projection positions at the unit period f4 and a direction in which the projection positions at the unit period f4 are shifted to the projection positions at the unit period f1 in the following frame.

Thus, in the second embodiment, the shift angles at the times of transitions between the unit periods are equal, which makes it less like to receive an influence of the shift operation being slow.

Figure 18:
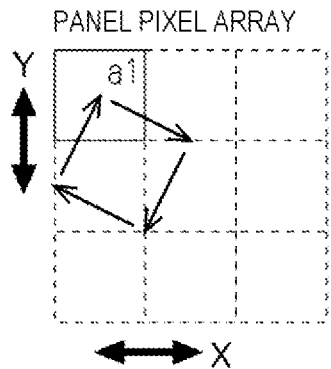
FIG. 18 is a diagram illustrating another operations of the shift device.

Note that, in the second embodiment, the panel pixel a1 represents the display pixels in the order of A1, C0, D2, and B3. However, the panel pixel a1 may represent the display pixels in the reverse order of A1, B3, D2, and C0. When the display pixels are represented in the reverse order, the shift operation by the shift device 2300 is performed in a manner illustrated in FIG. 18 with the panel pixel a1 being the reference.

Figure 19:
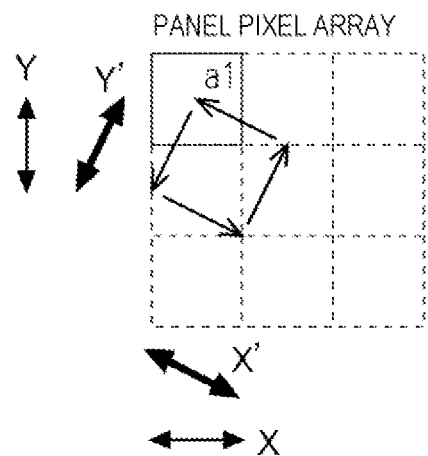
FIG. 19 is a diagram illustrating another operation of the shift device.

Furthermore, in the second embodiment, the two axes with which the shift device 2300 performs the shift operation may not be set to the horizontal X axis and the vertical Y axis, and may be set, for example, to an X' axis and a Y' axis obtained by rotating the X axis and the Y axis clockwise by 26.6 ($\cong \tan^{-1}$ (0.5/1.0)) degrees as illustrated in FIG. 19. With the X' axis and the Y' axis being set for the two axes with which the shift device 2300 performs the shift operation as described above, the shift amount at the time of transition between unit periods only requires 1.0 pixel along either one of the X' axis and the Y' axis, which makes it simplified and easy for the shift device 2300 to control.

In the present exemplary embodiment, one frame period is divided into four unit periods. In other words, description has been made by setting "4" as the number k of display pixels represented in the frame period F. However, the "k" is not limited to "4", and it is only necessary that the display pixels represented by one panel pixel in one frame period are not adjacent to each other in the X axis and are not adjacent to each other in the Y axis, and the k is equal to or more than "3".

In addition, the amount of shift in the embodiment falls in the maximum of 1.12 pixels, for example, when the shift is by 0.5 pixel of a panel pixel in the X axis and by 1.0 pixel of a panel pixel in the Y axis. However, the maximum shift may be equal to or more than this amount, provided that the shift device 2300 has a good responsivity.

In addition, although the embodiment or the like employs a normally black mode, a normally white mode may be employed. Furthermore, the liquid crystal panel 100R, 100G, 100B employs a transmissive type, but may also employ a reflective type.

From the modes that have been described as examples, it is possible to understand the following aspects, for example.

A liquid crystal projector according to one aspect (aspect 1) includes: a liquid crystal panel including a plurality of panel pixels; a shift device that shifts projection positions of the plurality of panel pixels; and a display control circuit that controls the liquid crystal panel and the shift device, in which the display control circuit controls the liquid crystal panel to cause one of the panel pixels to represent k (k is an integer equal to or more than 3) display pixels that are in a non-adjacent relationship in k unit periods in a frame period, and the display control circuit controls the shift device to vary the projection position for each of the k unit periods.

With this aspect, when a dark display pixel and a bright display pixel continue with each other, it is possible to avoid a state of the liquid crystal panel in which two panel pixels are categorized into a dark pixel and a bright pixel, and continue for two unit periods. This makes it possible to decrease a reduction in the display quality occurring due to the dark pixel and the bright pixel adjacent to each other.

In a specific aspect (aspect 2) according to the aspect 1, the display pixels and the panel pixels are arranged in a matrix manner along a first axis and a second axis, and the k display pixels are not adjacent to each other along the first axis and are not adjacent to each other along the second axis.

Note that the X axis is one example of the first axis, and the Y axis is one example of the second axis.

In a specific aspect (aspect 3) according to the aspect 1 or aspect 2, the display control circuit controls the shift device such that an amount of shift of a projection position from a projection position in a first unit period to a projection position in a second unit period is equal to an amount of shift of a projection position from the projection position in the second unit period to a projection position in a third unit period. With this aspect, the amounts of shift by the shift device at the times of transitions between the unit periods are equal, which makes it less likely to receive an influence of the shift operation by the shift device being slow.

Note that the unit period f1 is one example of the first unit period, the unit period f2 is one example of the second unit period, and the unit period f3 is one example of the third unit period.

In a specific aspect (aspect 4) according to the aspect 3, the display control circuit controls the shift device such that an angle formed by a first direction and a second direction is equal to an angle formed by the second direction and a third direction, the first direction being a direction in which the projection position in the first unit period is shifted to the projection position in the second unit period, the second direction being a direction in which the projection position in the second unit period is shifted to the projection position in the third unit period, and the third direction being a direction in which the projection position in the third unit period is shifted to a projection position in a following unit period.

With this aspect, the shift angles at times of transitions between the unit periods are equal. This makes it less likely to receive an influence of the shift operation being slow.

In a specific aspect (aspect 5) according to any one of the aspect 1 to the aspect 4, the liquid crystal panel includes a first liquid crystal panel corresponding to a first color, a second liquid crystal panel corresponding to a second color different from the first color, and a third liquid crystal panel corresponding to a third color different from the first color or the second color, and a panel pixel in the first liquid crystal panel, a panel pixel in the second liquid crystal panel, and a panel pixel in the third liquid crystal panel are combined.

With this aspect, it is possible to decrease a reduction in the display quality resulting from a dark pixel and a bright pixel being adjacent to each other in a color image.

Note that red (R) is one example of the first color, green (G) is one example of the second color, and blue (B) is one example of the third color.

What is claimed is:

1. A liquid crystal projector comprising:
   a liquid crystal panel including a plurality of panel pixels;
   a shift device that shifts projection positions of the plurality of panel pixels; and
   a display control circuit that controls the liquid crystal panel and the shift device, wherein
   the display control circuit controls the liquid crystal panel to cause one of the panel pixels to represent k display pixels that are in a non-adjacent relationship in k unit periods in a frame period, k being an integer equal to or greater than 3,
   the display control circuit controls the shift device to vary the projection position for each of the k unit periods,
   the display pixels and the panel pixels are arranged in a matrix manner along a first axis and a second axis, and
   the k display pixels are not adjacent to each other along the first axis and are not adjacent to each other along the second axis.

2. The liquid crystal projector according to claim 1, wherein
   the liquid crystal panel includes:
      a first liquid crystal panel corresponding to a first color;
      a second liquid crystal panel corresponding to a second color different from the first color; and
      a third liquid crystal panel corresponding to a third color different from the first color or the second color, and
   a panel pixel in the first liquid crystal panel, a panel pixel in the second liquid crystal panel, and a panel pixel in the third liquid crystal panel are combined.

3. A liquid crystal projector comprising:
   a liquid crystal panel including a plurality of panel pixels;
   a shift device that shifts projection positions of the plurality of panel pixels; and
   a display control circuit that controls the liquid crystal panel and the shift device, wherein
   the display control circuit controls the liquid crystal panel to cause one of the panel pixels to represent k display pixels that are in a non-adjacent relationship in k unit periods in a frame period, k being an integer equal to or greater than 3, the display control circuit controls the shift device to vary the projection position for each of the k unit periods, and the display control circuit controls the shift device such that an amount of shift of a projection position from a projection position in a first unit period to a projection position in a second unit period is equal to an amount of shift of a projection position from the projection position in the second unit period to a projection position in a third unit period.

4. The liquid crystal projector according to claim 3, wherein the display control circuit controls the shift device such that an angle formed by a first direction and a second direction is equal to an angle formed by the second direction and a third direction, the first direction being a direction in which the projection position in the first unit period is shifted to the projection position in the second unit period, the second direction being a direction in which the projection position in the second unit period is shifted to the projection position in the third unit period, and the third direction being a direction in which the projection position in the third unit period is shifted to a projection position in a following unit period.

\* \* \* \* \*